(12) United States Patent
Browne et al.

(10) Patent No.: US 9,315,321 B2
(45) Date of Patent: Apr. 19, 2016

(54) SUPPORT SYSTEM FOR MAGNETICALLY SUPPORTING AN OBJECT ON A SUPPORT

(71) Applicant: GM GLOBAL TECHNOLOGY OPERATIONS LLC, Detroit, MI (US)

(72) Inventors: Alan L. Browne, Grosse Pointe, MI (US); Nancy L. Johnson, Northville, MI (US); Nilesh D. Mankame, Ann Arbor, MI (US); Albert H. Butlin, Jr., Beverly Hills, MI (US); Roland Menassa, Macomb, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 161 days.

(21) Appl. No.: 13/908,279

(22) Filed: Jun. 3, 2013

(65) Prior Publication Data
US 2014/0358275 A1    Dec. 4, 2014

(51) Int. Cl.
H01F 7/20 (2006.01)
B65G 1/137 (2006.01)
B25J 9/16 (2006.01)
F16M 13/02 (2006.01)
A45C 13/10 (2006.01)
F16M 11/04 (2006.01)
F16M 11/22 (2006.01)
H01F 7/02 (2006.01)

(52) U.S. Cl.
CPC ............ *B65G 1/137* (2013.01); *A45C 13/1069* (2013.01); *B25J 9/1679* (2013.01); *F16M 11/041* (2013.01); *F16M 11/22* (2013.01); *F16M 13/022* (2013.01); *H01F 7/0263* (2013.01)

(58) Field of Classification Search
CPC ...... H01F 7/0263; B65G 1/137; B25J 9/1679; F16M 13/022; F16M 11/22; F16M 11/041; A45C 13/1069
USPC .......... 335/285, 286; 700/214, 245; 248/206.5
See application file for complete search history.

(56) References Cited

U.S. PATENT DOCUMENTS

| | | | |
|---|---|---|---|
| 4,941,236 A | 7/1990 | Sherman et al. | |
| 6,927,657 B1 | 8/2005 | Wu | |
| 6,971,147 B2* | 12/2005 | Halstead | 24/303 |
| 7,956,712 B2* | 6/2011 | Fullerton et al. | 335/285 |
| 2008/0282517 A1* | 11/2008 | Claro | 24/303 |
| 2009/0021333 A1* | 1/2009 | Fiedler | 335/285 |
| 2011/0018665 A1 | 1/2011 | Fullerton et al. | |
| 2011/0030174 A1 | 2/2011 | Fiedler | |
| 2012/0222382 A1 | 9/2012 | Brekke | |
| 2012/0256715 A1 | 10/2012 | Fullerton et al. | |

FOREIGN PATENT DOCUMENTS

| | | |
|---|---|---|
| CN | 1080146 A | 1/1994 |
| CN | 1347786 A | 5/2002 |

* cited by examiner

*Primary Examiner* — Bernard Rojas
(74) *Attorney, Agent, or Firm* — Quinn Law Group, PLLC

(57) ABSTRACT

A support system includes a support, a root magnet, an object, and a cover magnet. The root magnet is fixedly attached to the support. The cover magnet is fixedly attached to the object. The root magnet and the cover magnet are configured to be magnetically attracted to one another such that the object is magnetically attached to the support when the root magnet and the cover magnet are aligned with one another in an attachment arrangement. The root magnet and the cover magnet are configured to magnetically repel one another such that the object is detached from the support when the root magnet and the cover magnet are unaligned with one another in a detachment arrangement.

17 Claims, 4 Drawing Sheets

SUPPORT SYSTEM FOR MAGNETICALLY SUPPORTING AN OBJECT ON A SUPPORT

TECHNICAL FIELD

The present disclosure generally relates to a support system for magnetically supporting an object on a support.

BACKGROUND

Objects may be disposed in a container for shipment. Packaging materials, such as cardboard, foam, adhesive, and the like, may be used to secure and otherwise protect the objects from damage during transit or display.

SUMMARY

A support system includes a support, a root magnet, an object, and a cover magnet. The root magnet is fixedly attached to the support. The cover magnet is fixedly attached to the object. The root magnet and the cover magnet are configured to be magnetically attracted to one another such that the object is magnetically attached to the support when the root magnet and the cover magnet are aligned with one another in an attachment arrangement. The root magnet and the cover magnet are configured to magnetically repel one another such that the object is detached from the support when the root magnet and the cover magnet are unaligned with one another in a detachment arrangement.

An arrangement system includes a support system and a controller. The support system includes a support, a root magnet, an object, and a cover magnet. The root magnet is fixedly attached to the support. The cover magnet is fixedly attached to the object. The root magnet and the cover magnet are configured to be magnetically attracted to one another such that the object is magnetically attached to the support when the root magnet and the cover magnet are aligned with one another in an attachment arrangement. The root magnet and the cover magnet are configured to magnetically repel one another such that the object is detached from the support when the root magnet and the cover magnet are unaligned with one another in a detachment arrangement. The controller is operatively connected to the support system. The controller is configured to selectively activate at least one of the root magnet and the cover magnet such that the root magnet and the cover magnet are magnetically alignable with one another in the attachment arrangement. The controller is configured to selectively deactivate the at least one of the root magnet and the cover magnet such that the root magnet and the cover magnet are magnetically unalignable in the attachment arrangement.

A method of kitting a plurality of objects in an arrangement system includes providing a storage rack. The storage rack operatively supports a support system. The support system includes an object magnetically attached to a first root magnet in an attachment arrangement. A bill of materials for a batch is determined, where the bill of materials includes the object. The object magnetically attached to the first root magnet is identified as a function of the determined bill of materials. The object is unaligned from the first root magnet such that the object and the first root magnet are in a detachment arrangement. The object is removed from the first root magnet when the object and the first root magnet are in the detachment arrangement. A second root magnet that is magnetically alignable with the object in the attachment arrangement is identified. The object is magnetically aligned with the second root magnet such that the object and the second root magnet are in the attachment arrangement The above features and advantages, and other features and advantages, of the present invention are readily apparent from the following detailed description of some of the best modes and other embodiments for carrying out the invention, as defined in the appended claims, when taken in connection with the accompanying drawings.

DETAILED DESCRIPTION

Figure 1:
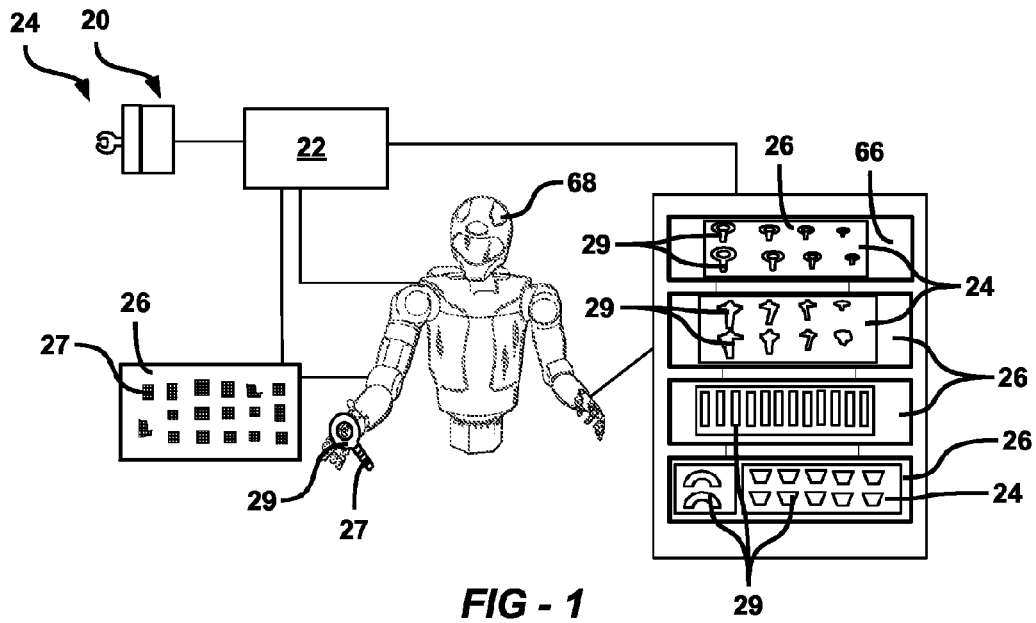
FIG. 1 is a schematic illustration of an arrangement system including a plurality of support systems, a controller, and a robot.

Referring to the drawings, wherein like reference numbers correspond to like or similar components whenever possible throughout the several figures, there is shown in FIG. 1 an arrangement system 20 that includes a controller 22 and at least one support system 24. The support system 24 includes a support structure 26, a root magnet 27, an object 29, and a cover magnet 31. The root magnet 27 is fixedly attached to the support structure 26 and the cover magnet 31 is fixedly attached to the object 29. As will be described in more detail below, the object 29 is magnetically attachable to, and magnetically detachable from, the support structure 26 by virtue of magnetic properties of the cover magnet 31 and the root magnet 27.

The root magnet 27 and the cover magnet 31 may be spatially modulated magnets, force-matched magnets, and the like. As used herein, the terminology "spatially modulated magnets" or "coded magnets" refers to an interaction of magnetic structures (not shown), each made up of geometric patterns of magnetic elements incorporated into a respective magnet surface. Each coded magnet includes a plurality of magnet elements 33, each of which is positive N and negative S polarity, which cooperate to provide a magnetic field. These magnetic structures may feature designs of magnetic elements varying in polarity, field strength, size, shape, location, and dipole orientation. By varying the geometric patterns of the magnetic elements, the corresponding magnetic structure can be engineered to produce precision-tailored magnetic fields, forces, and magnetic interactions with each other or with other ferro-magnetic and para-magnetic materials. Such magnetic structures may interact with each other or with other ferrous metals, and can be created from any magnetic material, including rare-earth based magnets, ferrites, and ceramics.

The geometric patterns of the individual magnetic elements of the root magnet 27 and the cover magnet 31 are configured to be magnetically attracted to one another when the two magnets have a specified relative position and orientation. As such, as shown generally in FIGS. 1-3, the root magnet 27 and the cover magnet 31 may be configured to be magnetically attracted to one another when the root magnet 27 and the cover magnet 31 are axially and/or rotationally aligned with one another in the attachment arrangement 28.

Figure 3:
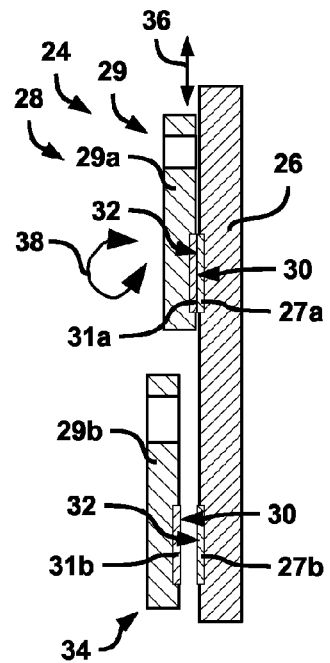
FIG. 3 is a cross-section side view of the support system of FIG. 2, taken along line 3-3.
Figure 4:
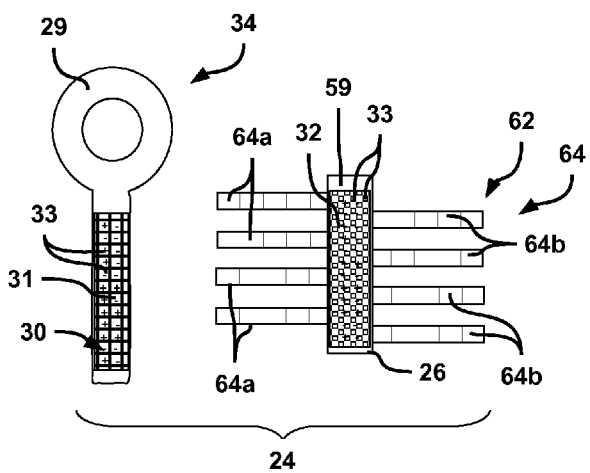
FIG. 4 is a schematic illustration of a top view one of the support systems in a detachment arrangement, including an object and a support having a plurality of fingers in an unclamped position.
Figure 6:
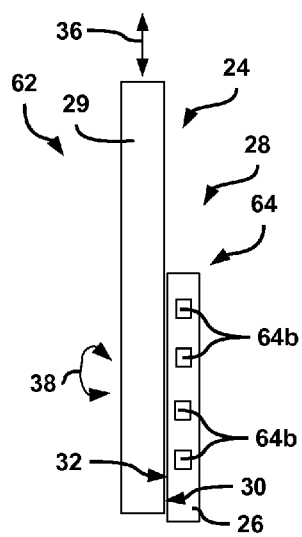
FIG. 6 is a schematic illustration of a side view of the support system of FIG. 5, in the attachment arrangement with the fingers in the unclamped position.

Referring to FIG. 3, the cover magnet 31 may present a cover surface 30 and the root magnet 27 may present a root surface 32. The cover surface 30 and the root surface 32 may be in contact relationship or separated by a fixed distance with one another when the cover magnet 31 and the root magnet 27 are aligned with one another in the attachment arrangement 28, as illustrated in FIGS. 4 and 6. It should be appreciated that contact relationship may require the cover surface 30 and the root surface 32 to physically contact one another or to separate the cover surface 30 and the root surface 32 a fixed distance from one another.

The root magnet 27 and the cover magnet 31 may also be configured to magnetically repel one another such that the object 29 is detached from the support structure 26 when the magnetic elements of the root magnet 27 and the cover magnet 31 are unaligned with one another in a detachment arrangement 34. In order to unalign the poles, the cover magnet 31 may be translated relative to the root magnet 27 in a direction that is generally transverse to the normal direction of magnetic force between the poles. Translation is generally represented by 36 and 38 in FIG. 3. During translation 36, 38, the cover surface 30 and the root surface 32 may remain in contact relationship with one another. As such, the root magnet 27 and the cover magnet 31 translate from the attachment arrangement 28 to the detachment arrangement 34. When in the detachment arrangement 34, the magnetic elements of the root magnet 27 and the cover magnet 31 are no longer in alignment with one another and the root magnet 27 and the cover magnet 31 magnetically repel one another, or do not attract one another, or attract one another with much less magnetic force than when in the attachment arrangement 28, facilitating the object 29 to be removed from the support structure 26.

Figure 2:
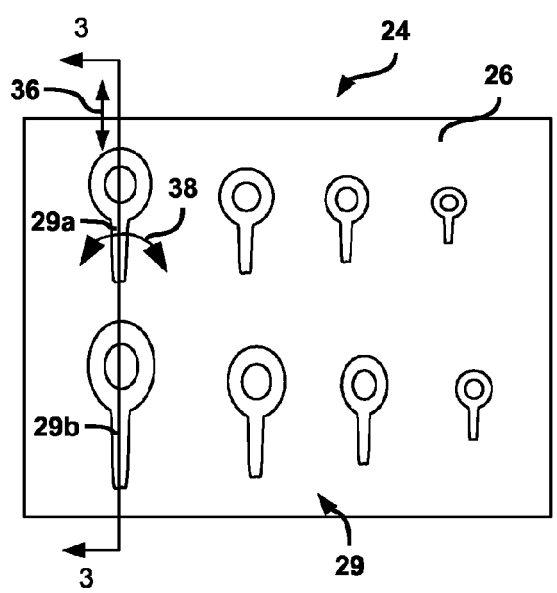
FIG. 2 is a schematic illustration of a top view of one of the support systems of FIG. 1.

Referring to FIGS. 2 and 3, the support system 24 may be configured to provide error proofing for the location of a plurality of different objects 29 on the support structure 26. By way of a non-limiting example, the support system 24 may provide an organized locating scheme for a plurality of different sized tools, e.g., a plurality of different metric sized tools, a plurality of different sized English tools, and the like. The support structure 26 may include a plurality of the root magnets 27, i.e., a first root magnet 27a, a second root magnet 27b, and the like. The first and second root magnets 27a, 27b are operatively attached to the support structure 26. The coded elements for each root magnet 27 are arranged in a unique geometric pattern that is unique from the other root magnets 27.

With continued reference to FIGS. 1-3, the support system 24 includes a plurality of different cover magnets 31, i.e., a first cover magnet 31a operatively attached to a first object 29a, a second cover magnet 31b operatively attached to a second object 29b, and the like. Each of the cover magnets 31 may include elements that are arranged in a unique geometric pattern that corresponds to, or is otherwise the mirror image of, the unique geometric pattern of the corresponding root magnet 27. For example, referring specifically to FIG. 3, the arrangement of elements of the first cover magnet 31a may correspond to only the arrangement of coded elements of the first root magnet 27a, the second cover magnet 31b may correspond to only the second root magnet 27b, and the like, as generally illustrated in FIGS. 1 and 2. This means that the first cover magnet 31a does not self-align in the attachment arrangement 28 with any other root magnet 27 than the first root magnet 27a and the second cover magnet 31b is not alignable in the attachment arrangement 28 with any other root magnet 27 than the second root magnet 27b. More specifically, the first cover magnet 31a does not self-align and attach with any other root magnet 27; it can be forcibly aligned, but will not attach and hold to the other root magnet 27. Conversely, the root magnets 27 and the corresponding cover magnets 31 are configured to not be magnetically attracted to one another, or attracted to one another with significantly less magnetic force than when in the attachment arrangement 28, in the axial direction when unaligned with one another so as to be in the detachment arrangement 34. As discussed previously, in the detachment arrangement 34, the objects 29 are detachable from the support structure 26. It should be appreciated that the support system 24 may be configured to support any number of objects 29.

Therefore, by configuring each of the cover magnets 31 to have a pattern that mirrors the pattern of only one of the root magnets 27, each of the objects 29 may be specifically located and arranged on the support structure 26. The specific location for each object 29 provides error proofing because only the required quantity and type of objects 29 may be attached to the support structure 26, thereby preventing unnecessary objects 29 from being attached to the support structure 26 as well as preventing an object being attached to the support structure 26 in the wrong position.

Figure 8:
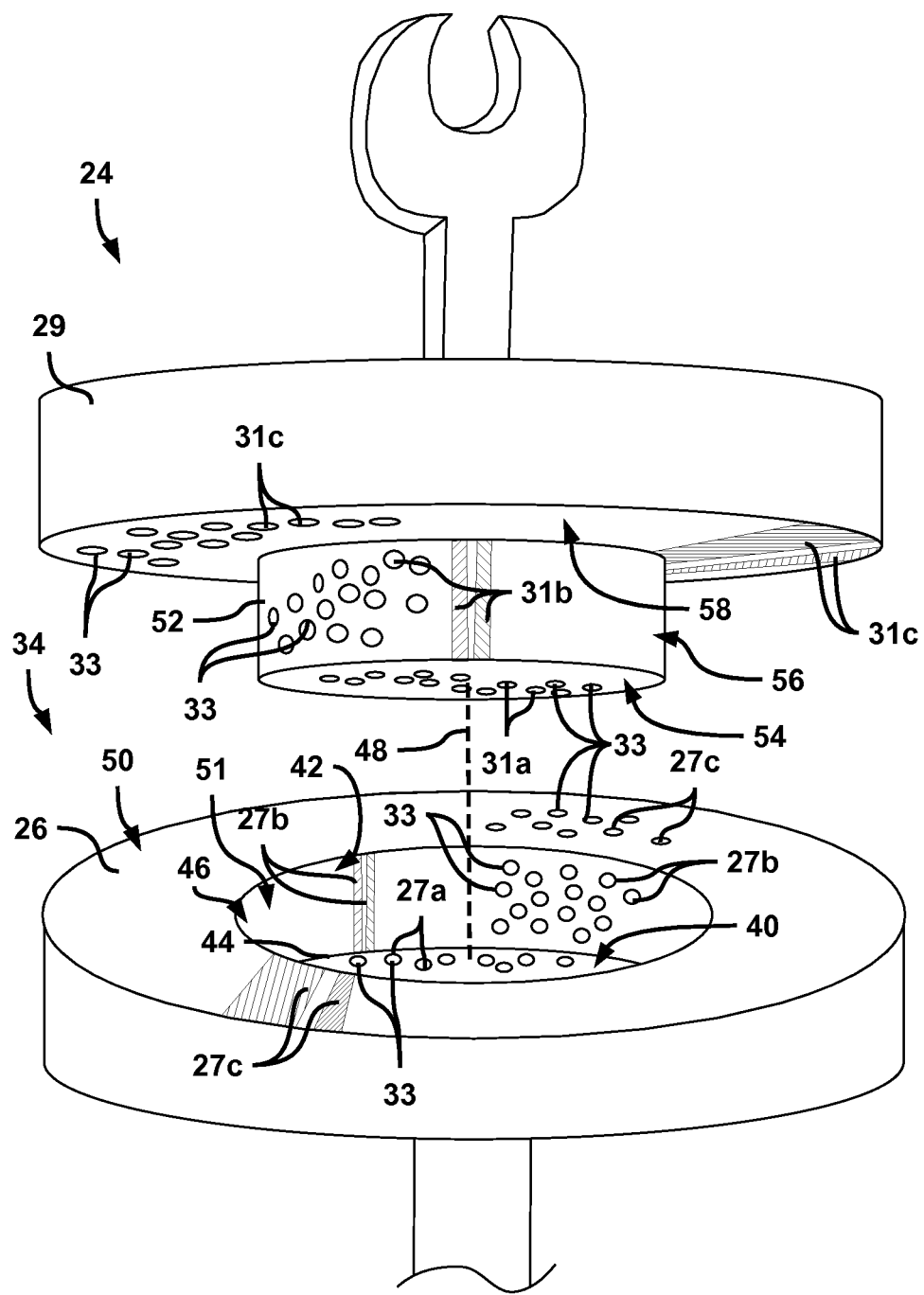
FIG. 8 is a schematic illustrative perspective side view of another one of the support systems of FIG. 1, including the support and the object removed from the support.
Figure 9:
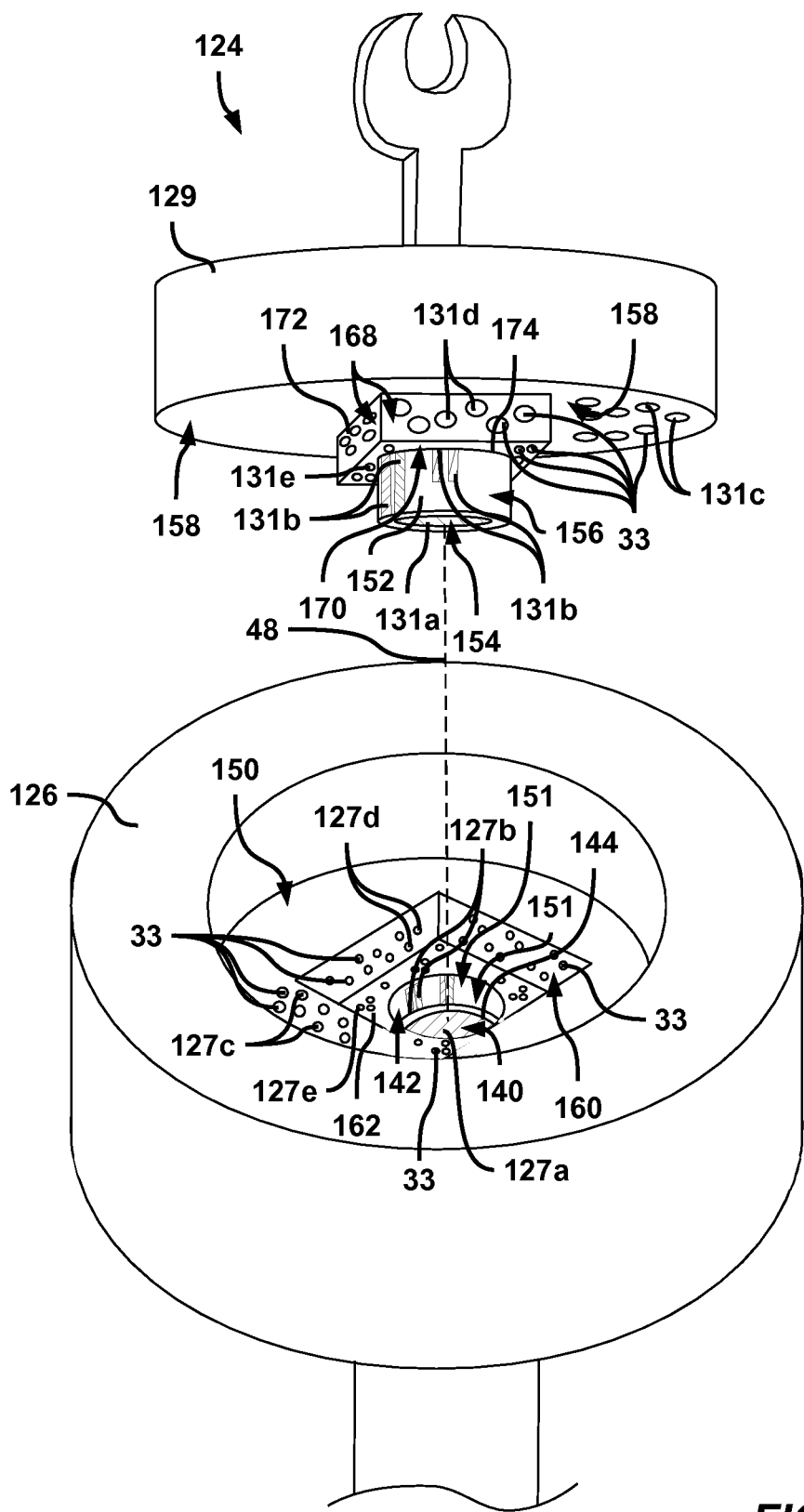
FIG. 9 is a schematic illustrative perspective side view of yet another one of the support systems of FIG. 1, including the support and the object removed from the support.

Referring to the embodiments shown in FIGS. 8 and 9, the support system 24 may be configured to provide alignment between the support structure 26 and one or more object 29. The alignment may be configured to ensure that the proper object 29 is attached to the support structure 26 in a desired location and/or orientation. In one non-limiting example, the support structure 26 may be an end effector and the object 29 may be an accessory or tool that is configured to be operatively supported by the end effector. Examples of accessories or tools include, but are not limited to, drill bits, driving type accessories such as a Philips or standard screwdriver, sockets, wrenches, and the like.

In the embodiment shown in FIG. 8, the support structure 26 may be an end effector that includes a first inner surface 40 and a second inner surface 42 extending generally perpendicularly from a perimeter 44 of the first inner surface 40 such that the first inner surface 40 and the second inner surface 42 cooperatively define a pocket 46 surrounding an axis 48. Since the magnets are intended only to achieve a proper alignment, and not to firmly hold the object 29 to the support structure 26, the pocket 46 may have a circular-shaped profile such that the pocket 46 is cylindrical. It should be appreciated that the pocket 46 is not limited to having a circular-shaped profile, as the pocket 46 may have other shaped profiles as well. The support structure 26 also includes a third inner surface 50 that extends in spaced and generally parallel relationship to the first inner surface 40. The third inner surface 50 defines an opening 51 to the pocket 46 such that the second wall extends between the first inner surface 40 and the third inner surface 50. It should be appreciated that other mechanical interlocks between the object 29 and the support structure 26 would be used to achieve force levels requisite for transmitting torque between the object 29 and the support structure 26.

With continued reference to FIG. 8, the root magnet 27 may be a first root magnet 27a, a second root magnet 27b, and a third root magnet 27c. The first root magnet 27a is operatively disposed on at least a portion of the first inner surface 40, the second root magnet 27b is operatively disposed on at least a portion of the second inner surface 42, and the third root magnet 27c is operatively disposed on at least a portion of the third inner surface 50.

The object 29 shown in FIG. 8 may include a shaft 52 that extends along the axis 48. The shaft 52 has a first outer surface 54 and a second outer surface 56 extending along the axis 48, generally perpendicularly from the first outer surface 54 such that the shaft 52 can mate with the pocket 46 defined in the support structure 26. The shaft 52 may have a circular-shaped profile such that the shaft 52 may be cylindrical in shape. It should be appreciated that the shaft 52 is not limited to being circular and may have other shapes as well. However, it should be appreciated that the interface between the shaft 52 and the pocket 46 is configured to provide only rotational alignment, in which minimal torque need be applied through the interface for performing the required function. If a circular shaft is desired for rotational alignment of the tool within the grip, then there needs to be some way of clamping or constraining the tool against rotation, once alignment is achieved. A third outer surface 58 extends from the second outer surface 56 of the shaft 52 in spaced and generally parallel relationship to the first outer surface 54. The shaft 52 is configured to be received in the pocket 46 of the corresponding support structure 26 such that the first outer surface 54 opposes the first inner surface 40, the second outer surface 56 opposes the second inner surface 42, and the third outer surface 58 opposes the third inner surface 50.

The cover magnet 31 may be a first cover magnet 31a, a second cover magnet 31b, and a third cover magnet 31c. The first cover magnet 31a is operatively disposed on at least a portion of the first outer surface 54, the second cover magnet 31b is operatively disposed on at least a portion of the second outer surface 56, and the third cover magnet 31c is operatively disposed on at least a portion of the third outer surface 58.

The inner surfaces 40, 42, 50 and outer surfaces 54, 56, 58 and the placement of the cover magnets 31a, 31b, 31c and the root magnets 27a, 27b, 27c on the respective inner surfaces 40, 42, 50 and respective outer surfaces 54, 56, 58 may provide error proofing and alignment of the object 29 with respect to the support structure 26. More specifically, the shaft 52 is moved along the axis 48 and inserted into the pocket 46 until the first outer surface 54 contacts the first inner surface 40 and the third outer surface 58 contacts the third inner surface 50 to ensure the object 29 is axially inserted completely into the pocket 46. The geometric pattern of the second cover magnets 31b and the second root magnet 27b is such that the second cover magnet 31b will only radially align with the second root magnet 27b in the attachment arrangement 28 during rotation of the object 29 relative to the support structure 26, about the axis 48, if the first outer surface 54 is in contact with the first inner surface 40 and the third outer surface 58 is in contact with the third inner surface 50 and the first, second, and third cover magnet 31a, 31b, 31c and the first, second, and third root magnet 27a, 27b, 27c together provide error proofing and temporary (or permanent) attachment. By temporary attachment, the force is configured to allow selection of a tool and its removal from the rack. The attachment force from the magnets may not be, or is likely not enough, to sustain machining forces. Once the tool is removed from the rack, a secondary (e.g., force mechanical interlock) mechanism may be used to secure the tool for sustaining mechanical forces (e.g., those arising from using the tool for a machining operation). Further, if the objects just need to be placed in a particular location, it may be possible for the magnets to become a securing force. If a wrong object is inserted into a support, these pairs of magnets will provide little or no attachment force. They may alternatively provide a repelling force. A force gauge on the support and/or tool can sense this and flag an error condition. The second pair of magnets 31b, 27b provides rotational orientation. This may not be important for some applications, e.g., a drill, but may be important for other applications, e.g., placing a rectangular bar in a rectangular socket.

Referring now to the embodiment of the support system 124 shown in FIG. 9, the support structure 126 may include a first inner surface 140, a second inner surface 142, a third inner surface 150, a fourth inner surface 160, and a fifth inner surface 162. The fifth inner surface 162 is axially disposed in spaced and generally parallel relationship between the first inner surface 140 and the third inner surface 150. The fifth inner surface 162 defines a first opening 151 where the second inner surface 142 extends between the first inner surface 140 and the third inner surface 150. The second inner surface 142 extends generally perpendicularly from a perimeter 144 of the first inner surface 140 such that the first inner surface 140 and the second inner surface 142 cooperatively define a pocket 146. The third inner surface 150 defines a first opening 151 that opens to the first pocket 146. The first pocket 146 extends along the axis 48. The first pocket 146 may have a profile that is circular in shape. However, it should be appreciated that the first pocket 146 may have a profile that is non-circular.

With continued reference to FIG. 9, the third inner surface 150 defines a second opening 164. The fourth inner surface 160 extends between the fifth inner surface 162 and the third inner surface 150 such that the fourth inner surface 160 surrounds the axis 48. The fifth inner surface 162 and the third inner surface 150 define a second pocket 166 that extends along the axis 48. The second opening 164, defined in the fifth inner surface 162, opens to the second pocket 166. The second pocket 166 may have a profile that is non-circular in shape. More specifically, the second pocket 166 may have a square-shaped profile. The second pocket 166 is axially disposed adjacent the first pocket 146 such that the first and second pockets 166 are open to one another.

Referring still to FIG. 9, the root magnet 127 may be a first root magnet 127a, a second root magnet 127b, a third root magnet 127c, a fourth root magnet 127d, and a fifth root magnet 127e. The first root magnet 127a is operatively disposed on at least a portion of the first inner surface 140, the second root magnet 127b is operatively disposed on at least a portion of the second inner surface 142, the third root magnet 127c is operatively disposed on at least a portion of the third inner surface 150, the fourth root magnet 127d is operatively disposed on at least a portion of the fourth inner surface 160, and the fifth root magnet 127e is operatively disposed on at least a portion of the fifth inner surface 162.

The object 129 of FIG. 9 may include a shaft 152 that has a first outer surface 154 and a second outer surface 156. The second outer surface 156 extends from the first outer surface 154 to be a mirror image of the pocket 146 defined in the support structure 126. A third outer surface 158 is disposed in spaced and generally parallel relationship to the first outer surface 154. The shaft 152 is configured to be received in the first pocket 146 of the corresponding support structure 126.

The object 129 further includes an orientation feature 172 axially disposed between an edge 174 of the shaft 152 and the third outer surface 158. The orientation feature 172 axially extends from the third outer surface 158 and may present a fourth outer surface 168 that surrounds the axis 48. More specifically, the fourth outer surface 168 may include four outer sides 176 combine to provide the orientation feature 172 having a square profile corresponding to the square profile defined in the second pocket 166 of the support structure 126. A fifth outer surface 170 extends from the edge 174 of the shaft 152 such that the fifth outer surface 170 extends in spaced and parallel relationship between the first outer surface 154 and the third outer surface 158. Therefore, when the shaft 152 is received in the first pocket 146 and the orientation feature 172 is disposed in the second pocket 166, the first outer surface 154 opposes the first inner surface 140, the second outer surface 156 opposes the second inner surface 142, the third outer surface 158 opposes the third inner surface 150, the fourth outer surface 168 opposes the fourth inner surface 160, and the fifth outer surface 170 opposes the fifth inner surface 162. It should be appreciated that the orientation feature 172 and the second pocket 166 are not limited to having a square profile, as profiles having other non-circular shapes may also be used to ensure radial orientation of the object 129 relative to the support structure 126, about the axis 48. Further, the non-circular profile of the orientation feature 172 and the corresponding second pocket 166 not only helps provide radial alignment between the object 129 and the support structure 126, but also allows torque to be transmitted between the object 129 and the support structure 126, about the axis 48. The dimensions are such that the second set of magnets 127b, 131b interact first, before any other sets 127a, 127c, 127d, 131a, 131c, 131d when the object is being progressively inserted into the support structure 126. These magnets may/may not provide error-proofing and their primary role is to provide rotational reorientation of the objects to enable continued insertion of the object 129 into the support structure 126. This reorientation is essential for continued insertion of the tool because the non-circular profiled orientation feature 172 requires proper alignment of the shaft and the socket for continued insertion. The remaining sets of magnets provide error-proofing and/or temporary or permanent attachment.

The cover magnet 131 may be a first cover magnet 131a, a second cover magnet 131b, a third cover magnet 131c, a fourth cover magnet 131d, and a fifth cover magnet 131e. The first cover magnet 131a is operatively disposed on at least a portion of the first outer surface 154, the second cover magnet 131b is operatively disposed on at least a portion of the second outer surface 156, the third cover magnet 131c is operatively disposed on at least a portion of the third outer surface 158, the fourth cover magnet 131d is operatively disposed on at least a portion of the fourth outer surface 168, and the fifth cover magnet 131e is operatively disposed on at least a portion of the fifth outer surface 170.

In the embodiment shown in FIG. 9, the object 129 may be progressively moved along the axis 48 and/or rotated about the axis 48, relative to the support structure 126, until the inner surfaces 140, 142, 150, 160, 162 progressively align with the corresponding outer surfaces 154, 156, 158, 168, 170. This means that the shaft 152 is disposed in the first pocket 146 when the orientation feature 172 is disposed in the second pocket 166. As such, contact of the first outer surface 154 with the first inner surface 140, contact of the third outer surface 158 with the third inner surface 150, and contact of the fifth outer surface 170 with the fifth inner surface 162 ensures that the shaft 152 is axially inserted completely into the first pocket 146 and the orientation feature 172 is axially inserted completely in the second pocket 166. The non-circular shape of the alignment feature and the second pocket 166 assists with radial orientation about the axis 48. It should be appreciated that in instances where a significant pull or tension force is exerted by the end effector, a mechanical interlock for resisting pulling motions may be required. By way of a non-limiting example, an element may be operatively disposed on the end effector that can be rotated so as to lock the end effector against pull forces once the end effector is properly aligned by the magnetic arrays. In one embodiment, an additional matching set of magnetic arrays could be employed to effect this final rotation, such as of a locking collar.

Additionally, with reference to FIG. 1, the controller 22 may be operatively attached to the root magnets 27 and/or the cover magnets 31. The controller 22 is configured to selectively activate at least one of the root magnets 27 and/or at least one of the cover magnets 31. Some magnets, e.g., 127a in FIG. 9, may be electro-magnets that can be activated/deactivated. But most magnets are permanent magnets that cannot be deactivated. The job of the controller is to bring the object into proximity with the support structure 126 (or vice-a-versa for end-effectors as supports) to allow the magnetic interactions to occur. These magnetic interactions will attach and/or align the object temporarily to the support if the object and support location are correctly paired or not attach the object to the support location if they do not form the right pair. The controller also interprets whether the object 29 is matched to the correct support by sensing the nature of the overall interaction (i.e., strong attraction, weak attraction, repulsion). Once activated, the root magnet 27 and the respective cover magnet 31 are alignable in the attachment arrangement 28. The controller 22 may also be configured to similarly deactivate one or more of the activated root magnets 27 and/or the activated cover magnets 31. Once deactivated, the root magnet 27 and the corresponding cover magnet 31 are unaligned in the detachment arrangement 34, allowing the cover magnet 31, along with the associated object 29, to be removed from the root magnet 27 and the associated support structure 26. The root magnets 27 and the cover magnets 31 may also be programmable, via the controller 22, such that they are selectively movable between being magnetically activated and being magnetically deactivated and also to achieve any desired geometric pattern. The programmability of the root magnets 27 and/or the cover magnets 31 may be used to provide error proofing between the object 29 and the support structure 26. By way of a non-limiting example, the root magnet 27 of the support structure 26 may be magnetically activated to achieve a geometric pattern that corresponds only to the first cover magnet 31a of the first object 29a. Therefore, only the first object 29a may be magnetically attached to the root magnet 27 of the support structure 26. However, if it is desired that a second object 29b is to be attached to the root magnet 27 of the support structure 26, then the root magnet 27 may magnetically deactivated such that the first object 29a is removed. The root magnet 27 may then be magnetically activated to achieve a geometric pattern that corresponds only to the second cover magnet 31b of the second object 29b.

Figure 7:
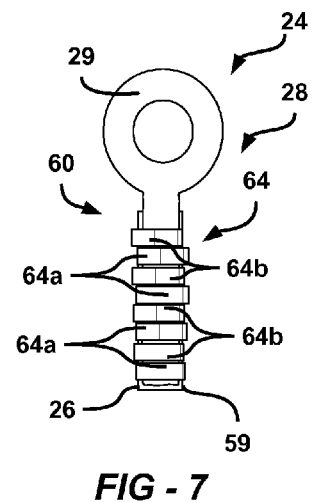
FIG. 7 is a schematic illustration of a top view of the support system, in the attachment arrangement with the fingers in a clamped position.

Referring again to the embodiments shown in FIGS. 4-7, the support structure 26 may include a base 59 and at least one finger 64 that extends from the root magnet 27. The support structure 26 may be part of a robot, a fixture, and the like. The root magnet 27 is operatively attached to the support structure 26. The finger 64 is configured to move between a clamped position 60, shown in FIG. 7, and an unclamped position 62, shown in FIGS. 4, 6, and 7. The finger 64 is configured to grasp the object 29 (or tool), as shown in FIG. 7, when the root magnet 27 and the cover magnet 31 are in the attachment arrangement 28. Likewise, each finger 64 is configured to release the object 29 when the root magnet 27 and the cover magnet 31 are in the detachment arrangement 34.

Figure 5:
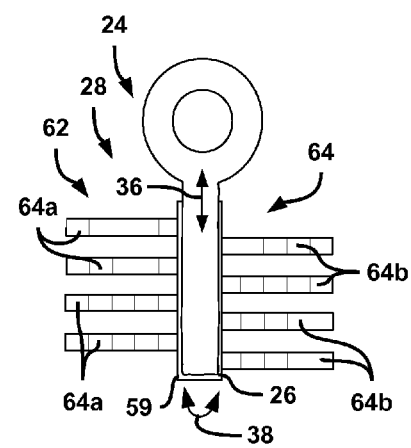
FIG. 5 is a schematic illustration of a top view of the support system of FIG. 4, in an attachment arrangement with the fingers in the unclamped position.

With continued reference to FIGS. 4-6, the finger 64 may include a plurality of fingers 64, e.g., at least one first finger 64*a* and at least one second finger 64*b*. The first fingers 64*a* extend from a first side of the root magnet 27 and the second fingers 64*b* extend from another side of the root magnet 27. The first fingers 64*a* and the second fingers 64*b* are configured to cooperatively grasp the object 29 when the root magnet 27 and the cover magnet 31 are in the attachment arrangement 28. The first finger 64*a* and the second finger 64*b* are also configured to cooperatively release the object 29 when the root magnet 27 and the cover magnet 31 are in the detachment arrangement 34. In many assembly operations, including those in which robots 68 are involved, very high forces are required to be delivered by the tools 29 during their operation/use and thus the forces required to hold the tools 29 to the support structure 26 may exceed the forces that can be provided by the magnetic arrays. Therefore, the magnetic arrays may be configured to properly locate/align the tool within a fixture (or unclenched hand of the robot 68) and then, once properly aligned, the fixture or grasping elements, i.e., the robot's fingers 64, may close around the tool such that the fingers deliver the forces required during the use/operation of the tool.

Therefore, in use, the cover magnets 31 of the tool 29 are aligned with root magnets 27 of the fingers 64. As discussed previously, the magnetic pattern provided by the root magnets 27 and the cover magnets 31 ensure proper tool 29 orientation and/or tool 29 selection. Next, the fingers 64 clamp down the tool to secure and maintain the tool 29 in the proper alignment. Then, the tool 29 is used. When use of the tool 29 is completed, the fingers 64 are released and the root magnets 27 and/or cover magnets 31 may be deactivated, allowing the tool 29 to be released from the fingers 64 of the support structure 26. It should be appreciated that at least one of the magnets 27, 31 may have their polarity reversed and/or the magnetic pattern of the magnets 27, 31 may be rearranged. The deactivation of the magnets, reversal of polarity, and/or rearrangement of the magnetic patterns may be performed by the controller 22 as a function of the specific tool 29 required. This provides error proofing, by ensuring only the required tool 29 is selected and attached to the support structure 26.

Referring again to FIG. 1, the support structure 26 may be operatively attached to a storage rack 66. The storage rack 66 may be any type of structure configured for holding and presenting at least one support structure 26. Further, there may be a plurality of storage racks 66. A plurality of the storage racks 66 may be arranged to support structure 26 or a plurality of support structure 26 structures. Each support structure 26 may be a panel, a container, and the like, configured for supporting at least one of the objects 29. Therefore, the ability to place a plurality of support structure 26 structures in storage racks 66 allows a plurality of the individual objects 29 to be "kitted". Kitting is the grouping or packaging of objects 29 to create a single shipment, based on a specified bill of materials. The kitting may allow unique shipments of different objects 29 to be grouped together. Also, kitting may allow for the reduction of inventory, since only the necessary objects 29 are provided on each support structure 26. Kitting may be used to manage inventory in manufacture, surgery, and the like. Further, since the objects 29 are magnetically attached to the respective support structure 26, excess dunnage may be reduced or otherwise eliminated all together. Dunnage is the packaging material used to protect objects 29 during shipment. Dunnage material includes, but is not limited to cardboard, foam, and the like. By eliminating excess dunnage and arranging each object 29 in a desired location and orientation on the corresponding support structure 26, a robot 68 may be able to readily locate, grasp, and remove objects 29 from the support structure 26 without interference by the excess dunnage. Therefore, the ease with which the robot 68 can locate objects 29 allows the robot 68 to kit the objects 29 and/or assemble the object 29. The elimination of excess dunnage also reduces waste products that would otherwise require recycling.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A support system comprising:
   a support including a base and at least one finger extending from the base;
   wherein the at least one finger is configured to move between a clamped position and an unclamped position;
   a root magnet fixedly attached to the base;
   an object;
   a cover magnet fixedly attached to the object;
   wherein the root magnet and the cover magnet are configured to be magnetically attracted to one another such that the object is magnetically attached to the support when the root magnet and the cover magnet are aligned with one another in an attachment arrangement such that the at least one finger is configured to grasp the object; and
   wherein the root magnet and the cover magnet are configured to magnetically repel one another such that the object is detached from the support when the root magnet and the cover magnet are unaligned with one another in a detachment arrangement such that the at least one finger is configured to release the object.

2. A support system, as set forth in claim 1, wherein the root magnet and the cover magnet are configured to be magnetically attracted to one another such that the object is magnetically attached to the support when the root magnet and the cover magnet are aligned axially with one another in an attachment arrangement; and
   wherein the root magnet and the cover magnet are configured to magnetically repel one another such that the object is detached from the support when the root magnet and the cover magnet are unaligned with one another axially in a detachment arrangement.

3. A support system, as set forth in claim 2, wherein the cover magnet is configured to translate relative to the root magnet in a direction that is generally transverse to the normal direction of magnetic attraction between the cover magnet and the root magnet such that the cover magnet and the root magnet move from the attachment arrangement to the detachment arrangement.

4. A support system, as set forth in claim 1, wherein the support further includes:
   a first inner surface surrounded by a perimeter; and
   a second inner surface extending generally perpendicularly from the perimeter of the first inner surface such that the first inner surface and the second support surface cooperatively define a pocket;

wherein the root magnet is a first root magnet operatively disposed on the first inner surface, and a second root magnet, operatively disposed on the second inner surface;

wherein the object further includes a shaft having a first outer surface and a second outer surface extending from the first outer surface;

wherein the cover magnet is a first cover magnet, operatively disposed on the first outer surface, and a second cover magnet, operatively disposed on the second outer surface;

wherein the first outer surface and the second outer surface are configured to be received in the pocket of the support such that the first outer surface opposes the first inner surface, the second outer surface opposes the second inner surface, the first root magnet opposes the first cover magnet, and the second root magnet opposes the second cover magnet.

5. A support system, as set forth in claim 4, wherein the support further includes a third inner surface;

wherein the root magnet further includes a third root magnet operatively disposed on the third inner surface;

wherein the object further includes a third outer surface;

wherein the cover magnet further includes a third cover magnet operatively disposed on the third outer surface;

wherein the third outer surface is configured to oppose the third inner surface and the third root magnet is configured to oppose the third cover magnet when the first outer surface and the second outer surface are received in the pocket of the support.

6. A support system, as set forth in claim 1, wherein the support is configured to be operatively attached to a storage rack.

7. A support system, as set forth in claim 1, wherein the root magnet is a first root magnet and a second root magnet;

wherein each of the first and second root magnets are operatively attached to the support;

wherein the cover magnet is a first cover magnet, operatively attached to a first object, and a second cover magnet, operatively attached to a second object;

wherein the first root magnet is configured to magnetically align with only the first cover magnet in the attachment arrangement such that the first object is magnetically attached to the support;

wherein the first root magnet and the first cover magnet are configured to magnetically repel one another in the detachment arrangement such that the first object is magnetically detached from the support;

wherein the second root magnet is configured to magnetically align with only the second cover magnet in the attachment arrangement such that the second object is magnetically attached to the support; and wherein the second root magnet and the second cover magnet are configured to repel one another when in the detachment arrangement such that the second object is magnetically detached from the support.

8. A support system, as set forth in claim 1, wherein the at least one finger is at least one first finger and at least one second finger;

wherein the at least one finger extends from a first side of the base and the at least one second finger extends from another side of the base;

wherein the at least one first finger and the at least one second finger are configured to cooperatively grasp the object; and wherein the at least one first finger and the at least one second finger are configured to cooperatively release the object.

9. An arrangement system comprising:
a support system including:
a support;
a root magnet fixedly attached to the support;
an object;
a cover magnet fixedly attached to the object;
wherein the root magnet and the cover magnet are configured to be magnetically attracted to one another such that the object is magnetically attached to the support when the root magnet and the cover magnet are aligned with one another in an attachment arrangement; and
wherein the root magnet and the cover magnet are configured to magnetically repel one another such that the object is detached from the support when the root magnet and the cover magnet are unaligned with one another in a detachment arrangement;
at least one storage rack configured for supporting the support system; and
a controller operatively connected to the support system;
wherein the controller is configured to selectively activate at least one of the root magnet and the cover magnet such that the root magnet and the cover magnet are magnetically alignable with one another in the attachment arrangement; and
wherein the controller is configured to selectively deactivate the at least one of the root magnet and the cover magnet such that the root magnet and the cover magnet are magnetically unalignable in the attachment arrangement.

10. An arrangement system, as set forth in claim 9, further comprising a robot operatively connected to the controller and the support system;

wherein the robot is configured to grasp the object and magnetically align the cover magnet of the object with the root magnet of the support to achieve the attachment arrangement in response to receiving a signal from the controller; and wherein the robot is configured to grasp the object and magnetically unalign the cover magnet of the object from the root magnet of the support to achieve the detachment arrangement in response to receiving a signal from the controller.

11. An arrangement system, as set forth in claim 9, wherein the support system is a plurality of support systems; and wherein the storage rack is configured for supporting a the plurality of support systems.

12. A method of kitting a plurality of objects in an arrangement system, the method comprising:

providing a storage rack, wherein the storage rack operatively supports a support system;

wherein the support system includes an object magnetically attached to a first root magnet in an attachment arrangement;

determining a bill of materials for a batch, wherein the bill of materials includes the object;

identifying the object magnetically attached to the first root magnet as a function of the determined bill of materials;

unaligning the object from the first root magnet such that the object and the first root magnet are in a detachment arrangement;

removing the object from the first root magnet when the object and the first root magnet are in the detachment arrangement;

identifying a second root magnet that is magnetically alignable with the object in the attachment arrangement; and magnetically aligning the object with the second root magnet such that the object and the second root magnet are in the attachment arrangement.

13. A method of kitting, as set forth in claim 12, further comprising:

identifying an additional object magnetically attached to an additional first root magnet as a function of the determined bill of materials;

unaligning the additional object from the additional first root magnet such that the additional object and the additional first root magnet are magnetically are in the detachment arrangement;

removing the additional object from the additional first root magnet;

identifying an additional second root magnet that is magnetically alignable with the additional object in the alignment arrangement; and magnetically aligning the additional object with the additional second root magnet such that the additional object and the additional second root magnet are in the attachment arrangement.

14. A method, as set forth in claim 13, wherein determining a bill of materials is further defined as electronically receiving a bill of materials for a batch from a controller, wherein the bill of materials includes the object and the additional object.

15. A method, as set forth in claim 12, wherein the first root magnet is operatively supported by one support system and the second root magnet is operatively supported by additional support system.

16. A method, as set forth in claim 15, wherein the additional support system is operatively supported by an end effector.

17. A method, as set forth in claim 15, further comprising mechanically locking the object to the additional support system once the object is magnetically aligned with the second root magnet in the attachment arrangement.

* * * * *